US010946810B2

(12) United States Patent
MacNeil et al.

(10) Patent No.: US 10,946,810 B2
(45) Date of Patent: Mar. 16, 2021

(54) CELL PHONE STAND

(71) Applicant: MACNEIL IP LLC, Bolingbrook, IL (US)

(72) Inventors: David F. MacNeil, Fort Lauderdale, FL (US); David S. Iverson, Oak Brook, IL (US)

(73) Assignee: MACNEIL IP LLC, Bolingbrook, IL (US)

(*) Notice: Subject to any disclaimer, the term of this patent is extended or adjusted under 35 U.S.C. 154(b) by 0 days.

(21) Appl. No.: 16/669,199

(22) Filed: Oct. 30, 2019

(65) Prior Publication Data
US 2020/0130605 A1 Apr. 30, 2020

Related U.S. Application Data

(63) Continuation-in-part of application No. 16/573,063, filed on Sep. 17, 2019, now Pat. No. 10,576,905,
(Continued)

(51) Int. Cl.
*H04M 1/00* (2006.01)
*B60R 11/02* (2006.01)
(Continued)

(52) U.S. Cl.
CPC ............ *B60R 11/0241* (2013.01); *H04M 1/04* (2013.01); *B60R 2011/005* (2013.01);
(Continued)

(58) Field of Classification Search
CPC ............ H04M 1/06; H04M 1/08; H04M 1/10; H04M 1/12; B60R 2011/0056;
(Continued)

(56) References Cited

U.S. PATENT DOCUMENTS 5,174,534 A 12/1992 Mitchell
5,285,938 A 2/1994 Fauchald
(Continued)

OTHER PUBLICATIONS amazon.com, website, image of Belkin Car Cup Holder for Smartphones, downloaded on Jan. 17, 2019.
(Continued)

*Primary Examiner* — Huy C Ho
(74) *Attorney, Agent, or Firm* — Perkins Ip Law Group LLC; Jefferson Perkins

(57) ABSTRACT

A cell phone stand has a base and a cell phone mounting bracket rotatably affixed to the base around a horizontal axis. The mounting bracket has a first jaw and a second jaw that is movable in a horizontal direction with respect to the first jaw. The first jaw has a first u-shaped channel with a first upper segment and a first lower segment. The second jaw has a second u-shaped channel with a second upper segment and a second lower segment. By adjusting the position of the jaws, the user may adjust a width between the first and upper segments, thus sizing the mounting bracket to receive a cell phone of a particular width. Even at the smallest such width, inner ends of the first and second lower segments of the u-shaped channels remain spaced from each other so as to permit the cell phone to be connected to an electrical cable while being held by the stand.

13 Claims, 12 Drawing Sheets

Related U.S. Application Data which is a continuation of application No. 16/172,826, filed on Oct. 28, 2018, now Pat. No. 10,717,396.

(51) Int. Cl.
*H04M 1/04* (2006.01)
*B60R 11/00* (2006.01)

(52) U.S. Cl.
CPC .......... *B60R 2011/0007* (2013.01); *B60R 2011/0071* (2013.01); *B60R 2011/0075* (2013.01)

(58) Field of Classification Search
CPC ..... B60R 2011/0057; B60R 2011/0059; B60R 2011/0068; B60R 2011/007; B60R 2011/0071; B60R 2011/0075; B60R 2011/0077; B60R 2011/0078; B60R 2011/008
USPC ...................................................... 455/575.1
See application file for complete search history.

(56) References Cited

U.S. PATENT DOCUMENTS

| | | | |
|---|---|---|---|
| 5,285,953 A | 2/1994 | Smith | |
| 5,676,340 A | 10/1997 | Ruhnau | |
| 5,745,565 A | 4/1998 | Wakefield | |
| D400,763 S | 11/1998 | Taylor et al. | |
| 5,897,041 A | 4/1999 | Ney et al. | |
| 6,019,325 A | 2/2000 | Dotson et al. | |
| 6,062,518 A | 5/2000 | Etue | |
| D439,116 S | 3/2001 | White | |
| 6,253,982 B1 | 7/2001 | Gerardi | |
| 6,267,340 B1 | 7/2001 | Wang | |
| 6,315,153 B1 | 11/2001 | Osborn | |
| 7,099,466 B2 | 8/2006 | Walsh | |
| 7,140,586 B2 | 11/2006 | Seil et al. | |
| 7,246,555 B2 | 7/2007 | Small et al. | |
| 7,708,247 B2 | 5/2010 | Lota | |
| 8,922,354 B2 | 12/2014 | Nagara et al. | |
| D735,112 S * | 7/2015 | Deng | D12/415 |
| 9,161,466 B2 | 10/2015 | Huang | |
| 9,162,630 B2 | 10/2015 | Pluta | |
| 9,254,793 B2 | 2/2016 | Won | |
| 9,573,532 B2 | 2/2017 | Riddiford et al. | |
| 9,698,851 B2 | 7/2017 | Andrus | |
| 9,710,016 B1 * | 7/2017 | Porzio | G06F 1/1656 |
| 9,758,248 B2 | 9/2017 | Procter et al. | |
| 9,821,723 B2 | 11/2017 | Mannarino | |
| 9,900,417 B1 | 2/2018 | Ruiz | |
| 10,155,482 B2 | 12/2018 | Corso | |
| 10,284,250 B2 | 5/2019 | Andrus | |
| 10,315,585 B2 | 6/2019 | Minn et al. | |
| 2002/0049081 A1 | 4/2002 | Heininger | |
| 2002/0094078 A1 | 7/2002 | Edwards | |
| 2009/0308993 A1 * | 12/2009 | Chang | F16M 13/005 248/176.3 |

OTHER PUBLICATIONS amazon.com, website, image of Custom Accessories 23384 Heavy Cup Mount Magnetic Phone Holder, downloaded on Jan. 17, 2019.
amazon.com, website, image of Macally Adjustable Automobile Cup Holder Phone Mount, downloaded on Jan. 17, 2019.
amazon.com, website, image of Mediabridge Smartphone Cradle w/Extended Cup Holder Mount, downloaded on Jan. 17, 2019.
amazon.com, website, image of NNDA CO Universal Adjustable Gooseneck Cup Holder Cradle Car Mount for Phone, downloaded on Jan. 17, 2019.
amazon.com, website, image of Sunjoyco Car Cup Holder Mount for Phone Tablet, 2-in-1 Car Cradles Adjustable Gooseneck Holder, downloaded on Jan. 17, 2019.
amazon.com, website, image of Tackform Solutions Car Phone Holder Magnetic Mount, downloaded on Jan. 17, 2019.
amazon.com, website, image of TNP Cup Holder Phone Mount, Universal Car Cup Smartphone Cradle Clamp w/ Flexible Neck, downloaded on Jan. 17, 2019.
amazon.com, website, image of USA Gear Cup Holder Suction Mount Surface Adapter, downloaded on Jan. 17, 2019.
crutchfield.com, website, image of BRACKETRON BT 16572 PhabGrip cup holder mount, downloaded on Jan. 17, 2019.
HDAccessory.com, website, image of Universal Smartphone Cup Holder Mount, downloaded on Jan. 17, 2019.
stacksocial.com, website, image of U-Grip Cup Holder Car Mount for Phones and Tablets, downloaded on Jan. 17, 2019.
walmart.com, website, image of Universal Adjustable Gooseneck Cup Holder Cradle Car Mount for Cell Phone, downloaded on Jan. 17, 2019.
rakuten.com, website, image of Smartphone 8" Long Car Cup Holder, IKross Phone Mount, downloaded on Jan. 17, 2019.

* cited by examiner

CELL PHONE STAND

RELATED APPLICATIONS

This application is a continuation in part of U.S. patent application Ser. No. 16/573,063 filed Sep. 17, 2019, which in turn is a continuation in part of U.S. patent application Ser. No. 16/172,826 filed Oct. 28, 2018. Both prior applications are copending, and both are owned by the Applicant hereof. The entire disclosures and drawings of these prior patent applications are fully incorporated herein by reference.

BACKGROUND OF THE INVENTION

Within the last two decades, cellular telephones ("cell phones") have become ever more popular as their abilities have increased. In addition to being telephones, the now-common "smart phone" is a personal data assistant, a screen for photos and videos, an Internet browser, a text messager, a music player, an email portal, a method of payment and receipt, a map, a direction finder, a scanner, a ride summoner, a camera and many other things. Because of their expanded functions, it has become common for people to have their cell phones closely at hand at all times.

The most common form of the current cell phone presents a screen in a front plane. Current cell phones have height and width dimensions that are far larger than their depth. Therefore, a cell phone, when placed on a desk, table or other horizontal surface, and placed face-up, will have its screen facing directly upward. This is usually not the optimum viewing angle for the cell phone. Therefore, cell phone stands have been developed that may be placed on a horizontal surface, but which tilt the cell phone so that its screen is inclined to the horizontal surface. As so inclined, the screen of the cell phone is in a plane more perpendicular to the line of sight from the user, easing the user's viewing of the screen. Many such stands further have accommodations for the attachment of an electrical cable to the cell phone for communications and power supply purposes.

Cell phones come in a variety of sizes, as do their users. An ideal cell phone stand therefore will have a means for adjusting its viewing plane, as well as a means for holding cell phones of different sizes. Further, current cell phones tend to be fairly heavy or dense structures for their size, due to their on-board batteries, integrated circuits and screen components. The ideal cell phone stand therefore will be able hold a cell phone and exhibit resistance to lateral forces tending to tip over the loaded cell phone stand, to laterally displace the stand and/or to separate the cell phone from the stand.

SUMMARY OF THE INVENTION

According to one aspect of the invention, a cell phone stand has a base with a bottom end and a top end disposed above the bottom end. A mounting pier extends upwardly from the top end of the base. A cell phone mounting bracket is rotatably affixed to the pier around a horizontal axis and has first and second jaws. The first jaw has a first u-shaped channel with a first upper segment. The second jaw has a second u-shaped channel with a second upper segment, disposed in parallel and spaced from the first upper segment. The second jaw is movable with the respect to the first jaw so that a width, taken in a direction parallel to the horizontal axis, between the first upper segment and the second upper segment may be adjustable by a user so as to fit a width of the cell phone to be received by the cell phone mounting bracket. Means are provided to affix the second jaw relative to the first jaw in any of a plurality of positions.

The first u-shaped channel further has a first lower segment and the second u-shaped channel has a corresponding second lower segment. The first and second lower segments are aligned with each other and are disposed in a plane parallel to the horizontal axis. The first and second lower segments are adapted to hold a lower end of the cell phone. In one embodiment, there is a space in between a first inner end of the first lower segment and a second inner end of the second inner segment, even when the second jaw is moved to the closest position that it can take relative to the first jaw. The first and second inner ends define an access hole or opening between them, for a cell phone electrical cable such as a firewire cable. Such cables typically are plugged into a port in a bottom edge of the cell phone.

In one embodiment the base includes first, second and third legs each radially extending outward from a vertical axis of the base. Each of the legs terminates in a foot, which is provided with a contact surface. In one embodiment, the contact surface is provided by a gripping member made of a material whose coefficient of friction, relative to a horizontal surface on which the stand is to be placed, is greater than a coefficient of friction of the material forming the first, second and third legs. In one embodiment, the gripping members have contact surfaces that occupy a plane that is below the bottom margin of the first, second and third legs, assuring the engagement of the horizontal stand support surface (such as a desk) with the contact surfaces rather than the bottom margin of the legs.

The present invention provides a stand which may be easily adjusted for a particular cell phone, and whose viewing angle may be easily adjusted so as to be optimum for the cell phone user. Once the width of the jaws is set and once the angular position of the cell phone mounting bracket is set to the satisfaction of the user, the user may easily slip the cell phone into, and remove the cell phone from, the stand, with or without an electrical cable attached, and by a single hand. The stand nonetheless securely holds the cell phone until the user decides to remove it.

BRIEF DESCRIPTION OF THE DRAWINGS

Further aspects of the invention and their advantages can be discerned in the following detailed description as read in conjunction with the drawings of exemplary embodiments, in which like characters denote like parts and in which.

DETAILED DESCRIPTION

Figure 1:
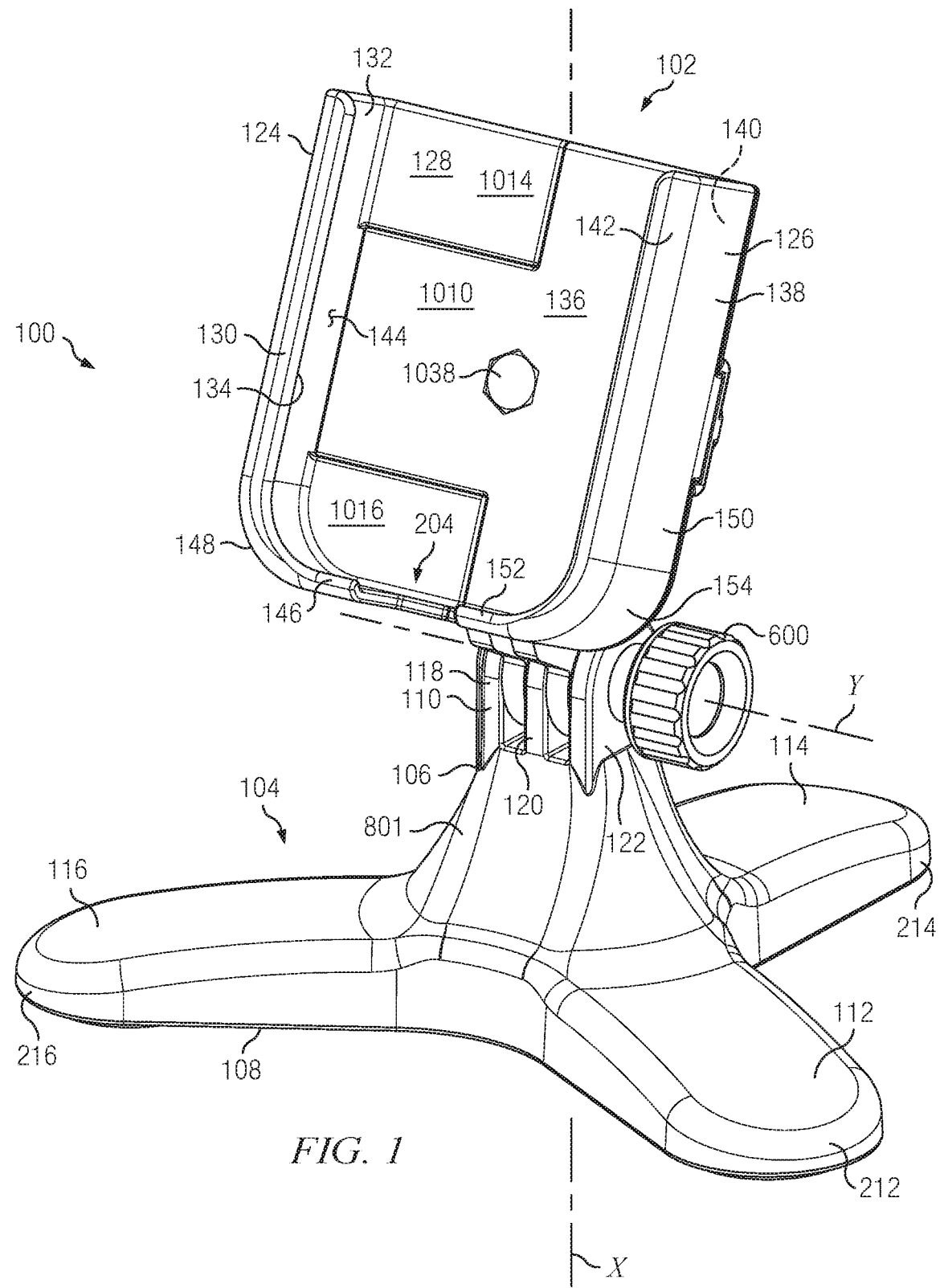
FIG. 1 is a top front perspective view of a cell phone stand according to the invention, jaws of a cell phone mounting bracket being shown in a smallest-width position.

Referring first to FIG. 1, a stand 100 according to the invention has two main parts: a cell phone mounting bracket 102 and a base 104. The base 104 is generally oriented around a vertical axis X. A body 801 of the base 104 has a top end 106 that is disposed above a bottom end 108. A mounting pier 110 upwardly extends from the top end 106. In one embodiment, the base 104 includes first, second and third legs 112, 114 and 116, which in general radially outwardly extend from the vertical axis X and which in this embodiment are separated from each other by 120 degrees. While the base 104 could have four or more legs, three are preferred, as they help unambiguously define three points of a plane occupied by the foot gripping surfaces (later described). Four or more legs might introduce wobbling, particularly if the base 104 is placed on a surface that is uneven or not completely planar.

The bracket 102 is rotatably affixed to the mounting pier 110 around a horizontal axis Y. In one embodiment the mounting pier has at least one, and in this embodiment three, upstanding pier plates 118, 120 and 122, each of which have a length and a width greater than their thickness (the thicknesses being in a direction parallel to axis Y) and each of which is disposed to be parallel to and spaced from the others. Body 801, including legs 112-116 and the mounting pier plates 118-122, can be integrally injection-molded of a tough plastic such as ABS.

The cell phone mounting bracket 102 has a first jaw 124 and a second jaw 126. In the illustrated embodiment the second jaw 126 is disposed on the left side of the bracket 102 and is movable, in a direction parallel to axis Y, towards and away from the first jaw 124, which in this embodiment is stationary.

The first jaw 124 includes a first back plate 128 that aids in the support of a back of a cell phone and generally resides in a plane, the angle of which may be adjusted by the user relative to axis Y. A first u-shaped channel 130 forwardly extends from a margin of the first back plate 128, in a direction orthogonal to the plane occupied by back plate 128. The first u-shaped channel has a channel bottom 132 disposed to be orthogonal to first back plate 128 and an outer lip 134 disposed to be in a plane parallel to, but spaced forwardly of, the first back plate 128. A depth of the first u-shaped channel 130 is selected to accommodate most current cell phones, and in some embodiments may be specified so as to further accommodate the jackets with which users frequently encase their cell phones.

The second, movable jaw 126 includes a second back plate 136 that also aids in the support of the back of the cell phone. The second back plate 136 resides substantially in the same plane as that occupied by first back plate 128, although parts of it slide over parts of the first back plate 128, as will be later described. A second u-shaped channel 138 of jaw 126 forwardly extends from the second back plate 136, in a direction orthogonal to the plane occupied by back plate 136. The second u-shaped channel 138 has a channel bottom 140 disposed to be orthogonal to the second back plate 136, and an outer lip 142 disposed to be in a plane parallel to, but spaced forwardly of, the second back plate 136. A depth of the second channel bottom 140 may match the depth of channel bottom 132 and should be selected to accommodate a variety of cell phones, jacketed and unjacketed.

The first u-shaped channel 130 has a first upper segment 144 disposed in a plane that is parallel to axis X, and a first lower segment 146 disposed in a plane that is parallel to axis Y. In use, the first upper segment 144 will be oriented in an inclined plane relative to the horizontal, and most of the time will be oriented so as to be at an angle to vertical axis X. The first upper segment 144 and the first lower segment 146 may be joined by a curved transition 148.

Figure 4:
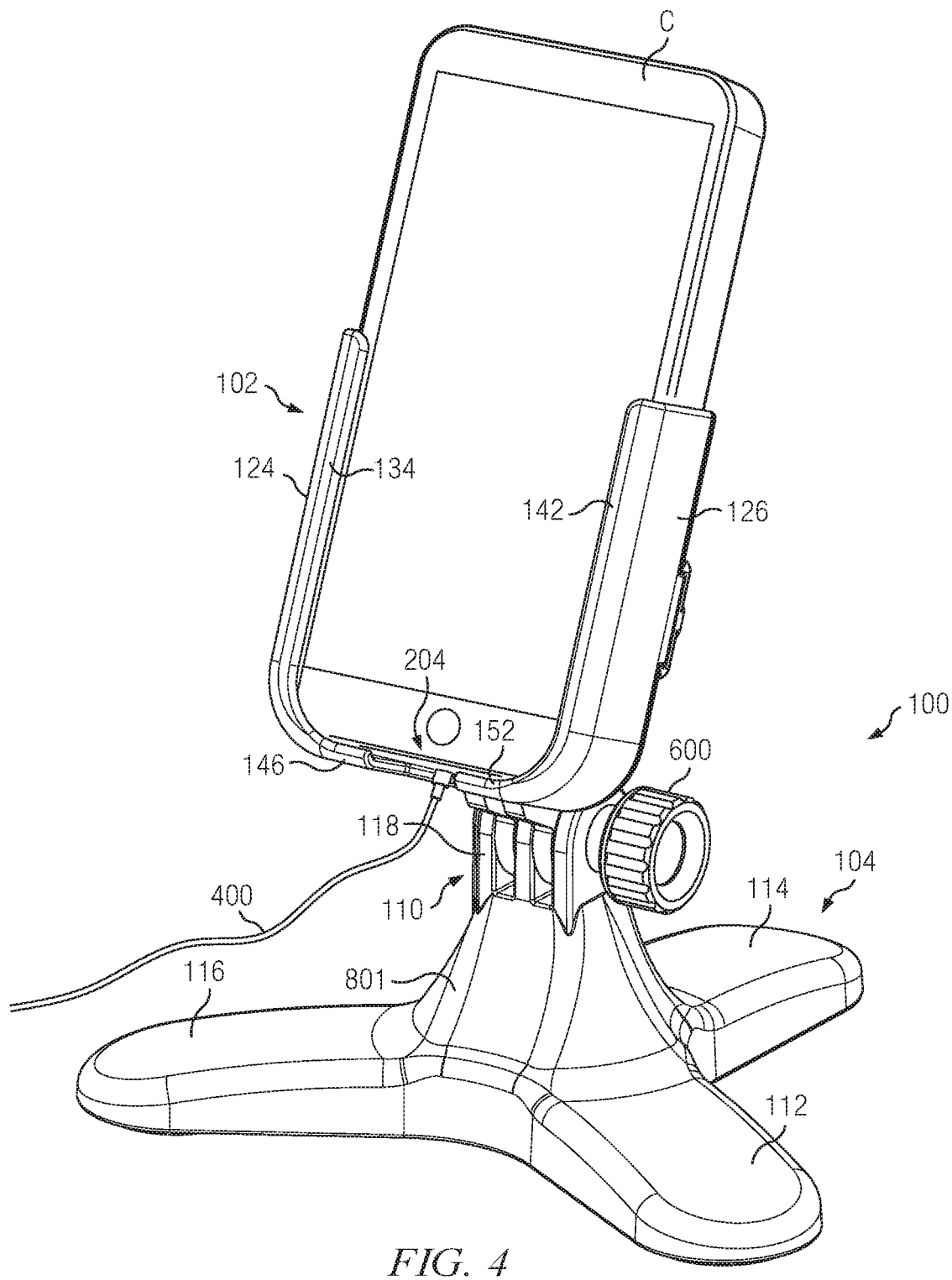
FIG. 4 is a top front perspective view of a cell phone stand as configured in FIG. 1, but shown with the stand holding a cell phone and an electrical cable plugged into the cell phone.
Figure 5:
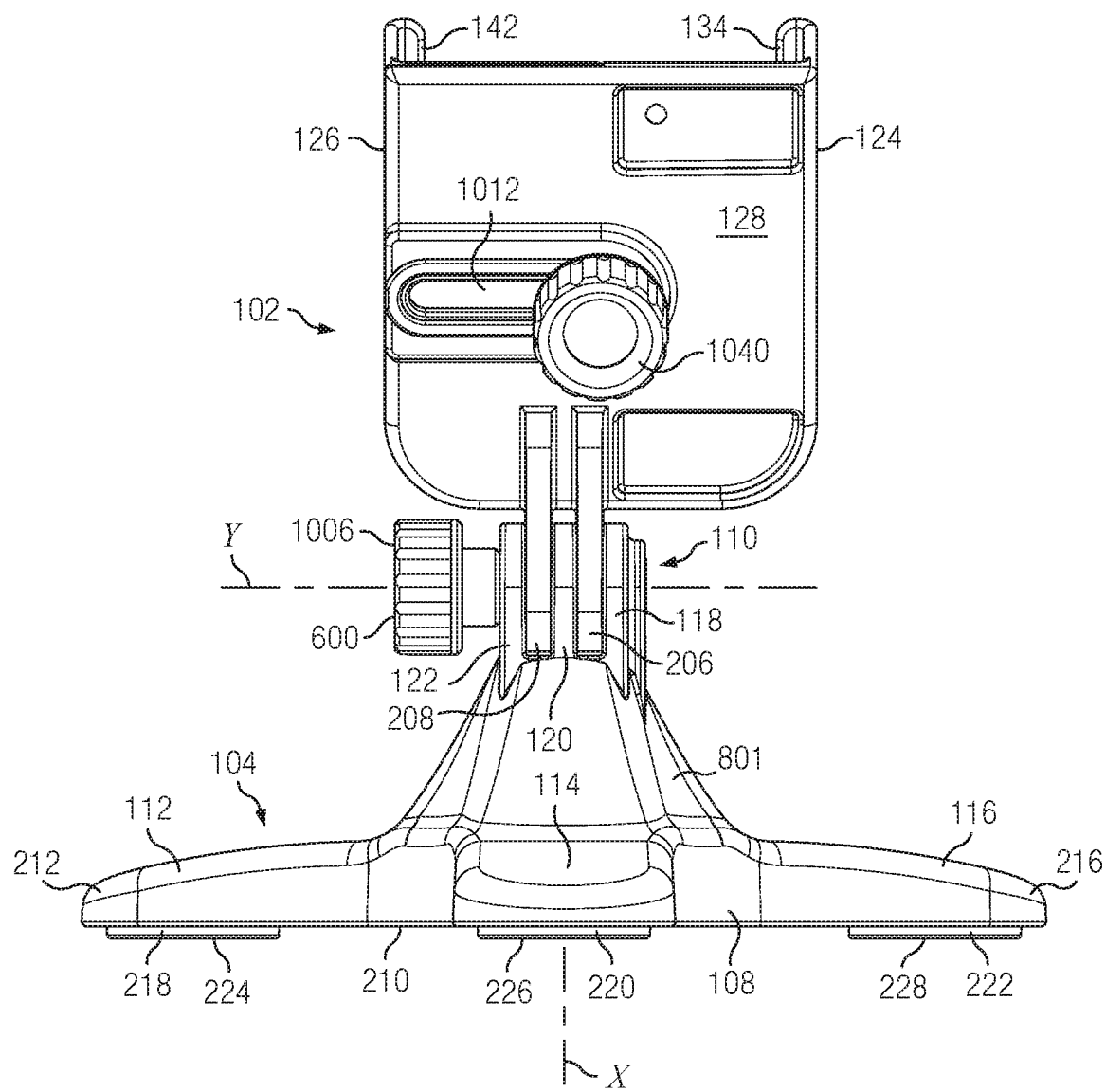
FIG. 5 is a rear view of the embodiment as shown and configured in FIGS. 1 and 2.

Similarly, the second u-shaped channel 138 has a second upper segment 150 disposed to be in substantially the same inclined plane occupied by first upper segment 144, and a second lower segment 152 disposed in a plane that is parallel to horizontal axis Y. Second segments 150 and 152 may be joined by a curved transition 154. The first upper segment 144 and the second upper segment 150 have open sides and bottoms that face each other, and their separation from each other defines a width which may be adjusted to receive a cell phone of a particular width. On the other hand, the first lower segment 146 and the second lower segment 152 are aligned to each other, and their bottoms and openings face the same, generally upward direction. As shown in FIG. 4, first and second lower segments 146 and 152 support the bottom of the cell phone C.

Figure 2:
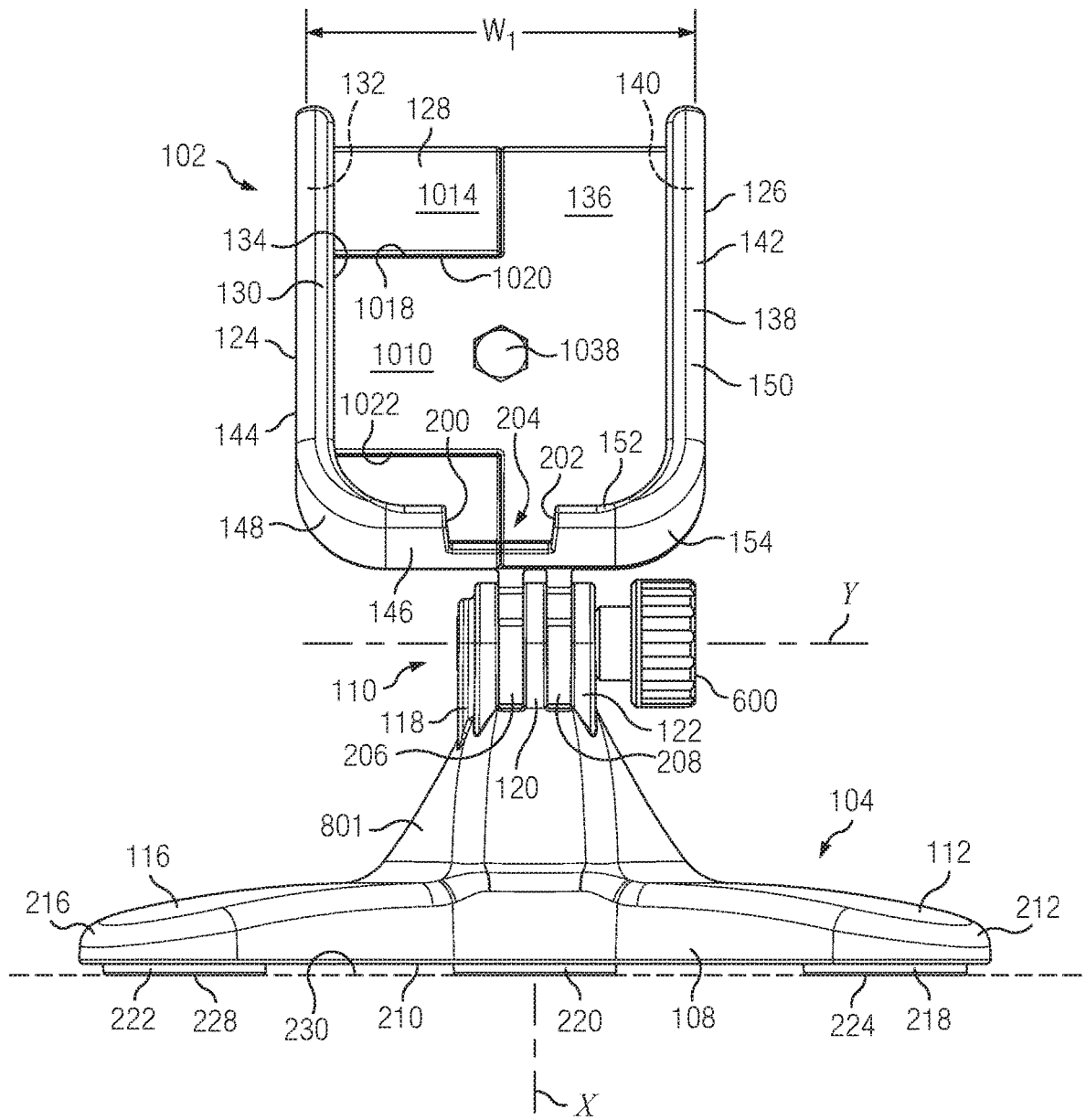
FIG. 2 is a front view of the cell phone stand as configured in FIG. 1.

FIG. 2 shows the cell phone mounting bracket 102 in a smallest width position, in which the inwardly facing surface of the bottom of second upper segment 150 is spaced by a width $W_1$ from the inwardly facing surface of the bottom of first upper segment 144. This closed or minimum-width position accommodates cell phones of a small width. The outer or forward lip 134 of the first u-shaped channel 130, and most of the bottom 132 of the first u-shaped channel 130, terminate at an inner end 200. Similarly, the outer or forward lip 142, and most of the bottom 140, of the second u-shaped channel 138, terminate at an inner end 202. Even in the closed position shown here, the horizontal channel segment ends 200 and 202 leave a hole or opening 204 for the insertion of a cell phone electrical cable 400 (see FIG. 4), such as a firewire cable, into a port in the bottom of cell phone C.

Figure 3:
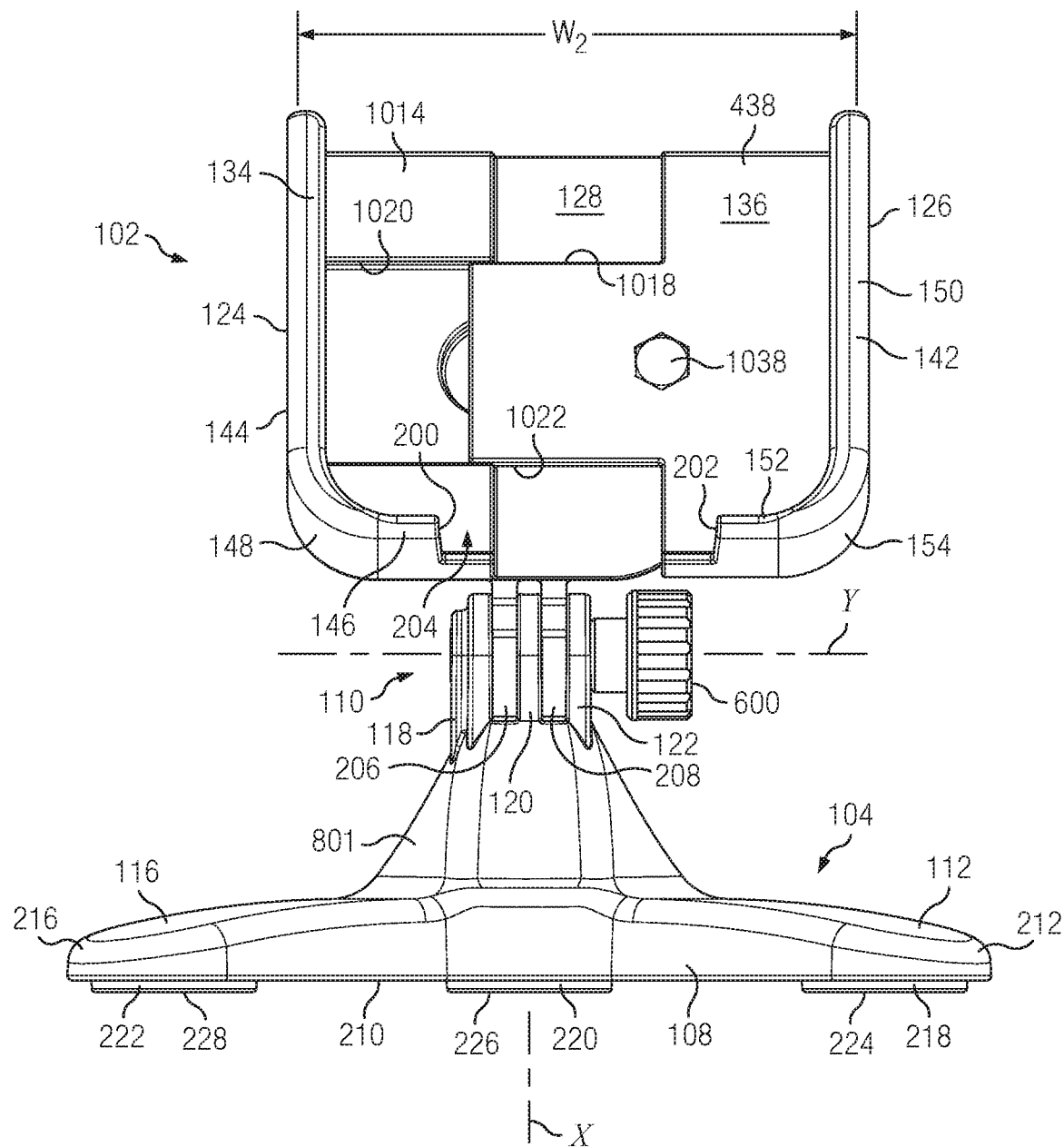
FIG. 3 is a view similar to that shown in FIG. 2, but with the cell phone mounting bracket jaws shown in a largest-width position.

FIG. 3 is a view similar to FIG. 2, but showing movable jaw 126 at a second and maximum-width W2 at which the bottom of its channel upper segment 150 is spaced farthest away from the bottom of first channel upper segment 144. This second position accommodates cell phones of a relatively large width. As seen in FIG. 4, and once the width between the jaws 124, 126 has been appropriately adjusted, the lips 134, 142 of the u-shaped channels 130, 138 prevent the cell phone C from falling out of the mounting bracket 102.

Returning to FIG. 2, the cell phone mounting bracket 102 is supported on base 104 by a right support plate 206 and a left support plate 208. Support plates 206 and 208 can be integrally molded with, and can downwardly extend from, the first, stationary jaw 124. Support plates 206 and 208 are generally flat and occupy vertical planes that are orthogonal to the axis Y and are parallel to each other. As assembled to the mounting pier 110, support plate 206 occupies the space between pier plates 118 and 120, while support plate 208 occupies the space between pier plates 120 and 122. While in other embodiments a single support plate could be rotatably affixed to a single pier plate, the provision of multiple pier plates and support plates increases the rigidity and strength of the articulated structure. As unclamped, the surfaces of support plates 206, 208 slide past adjacent surfaces of pier plates 118, 120 and 122, but as clamped, the support plates 206 and 208 and pier plates 118, 120 and 122 afford large surface areas through which large frictional forces may be generated by compression.

The bottom end 108 of the base 104 has a lower margin 210 that, in this embodiment, occupies a horizontal plane. Each of the legs 112, 116, 118 terminates in a foot 212, 214, 216 that is equipped with a respective gripping member 218, 220 or 222 (only feet 212, 216 are visible in FIG. 2; see, e.g., FIG. 8 for foot 214). The bottom or contact surfaces 224, 226 (FIG. 8) and 228 of respective gripping members 218, 220 and 222 are disposed in a plane 230 that is downwardly displaced from the bottom margin 210. The gripping members 218-222 can be formed of a material with a coefficient of friction, relative to the surface on which stand 100 is to be placed, that is higher than the coefficient of friction of the material making up base body 801. For example, gripping members 218-222 can be formed of an elastomer, and more particularly can be molded of a thermoplastic elastomer (TPE). The downward displacement of contact surfaces 224-228 from bottom body margin 210 ensures that the contact surfaces 224-228 will fully support the combined weight of the stand 100 and the cell phone C, and that none of this weight will be borne by bottom body margin 210. This optimizes the gripping action of members 218-222.

Figure 6:
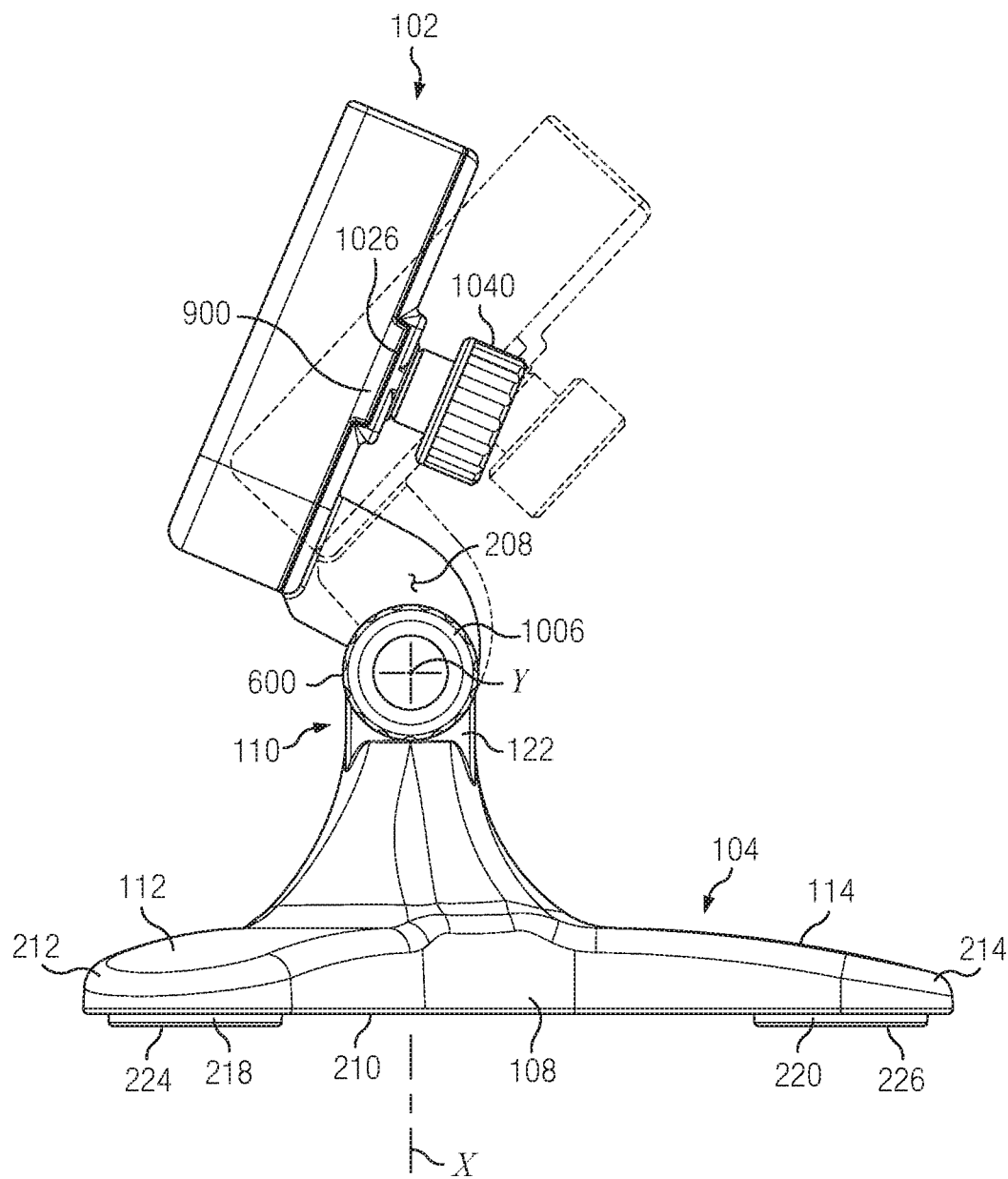
FIG. 6 is a right side view of the embodiment shown in FIGS. 1, 2 and 5, an alternative angular position of the cell phone mounting bracket being shown in dotted line.
Figure 7:
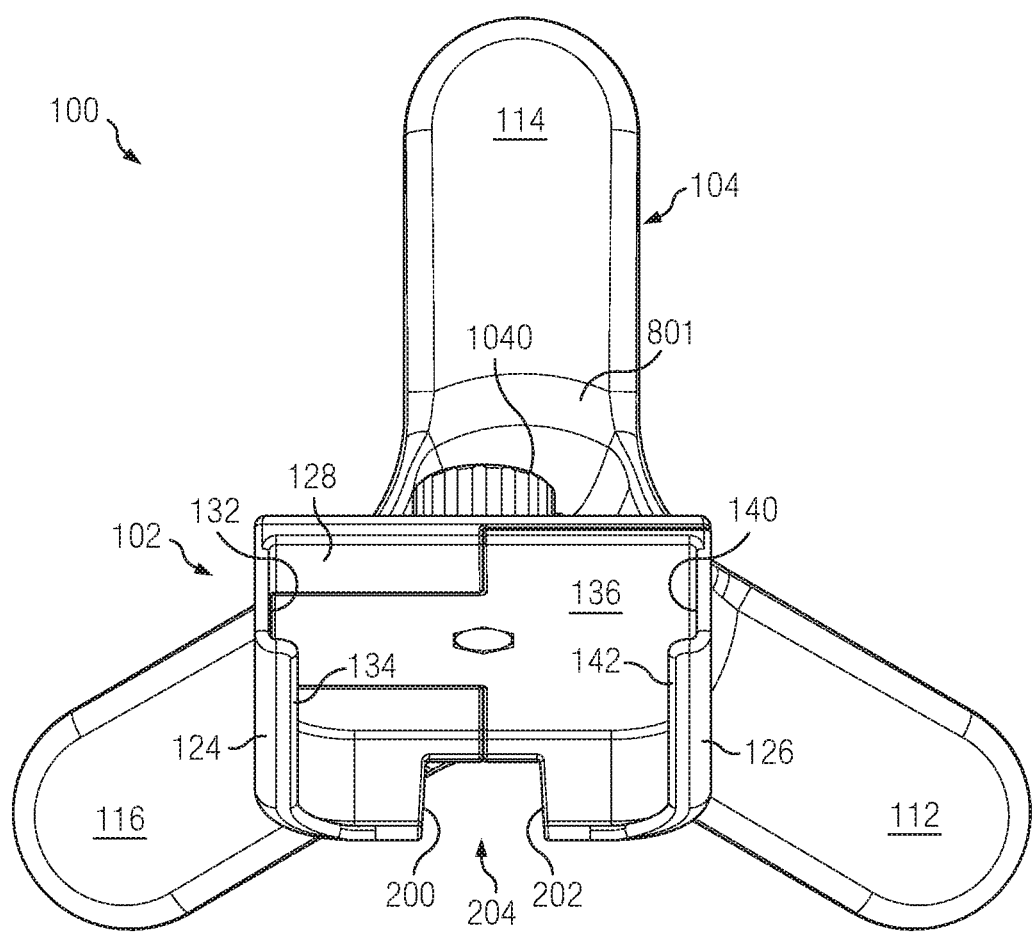
FIG. 7 is a top view of the embodiment as shown and configured in FIGS. 1-2 and 5-6.

FIG. 6 best shows the articulation of the cell phone bracket 102 around mounting pier 110. By clamping and unclamping the pier clamping screw 600, the user may adjust the angle of the cell phone screen for optimum visibility. An alternative angular position of the cell phone mounting bracket 102, and therefore of the cell phone that it holds, is seen in this FIG. 1*n* dotted line.

Figure 8:
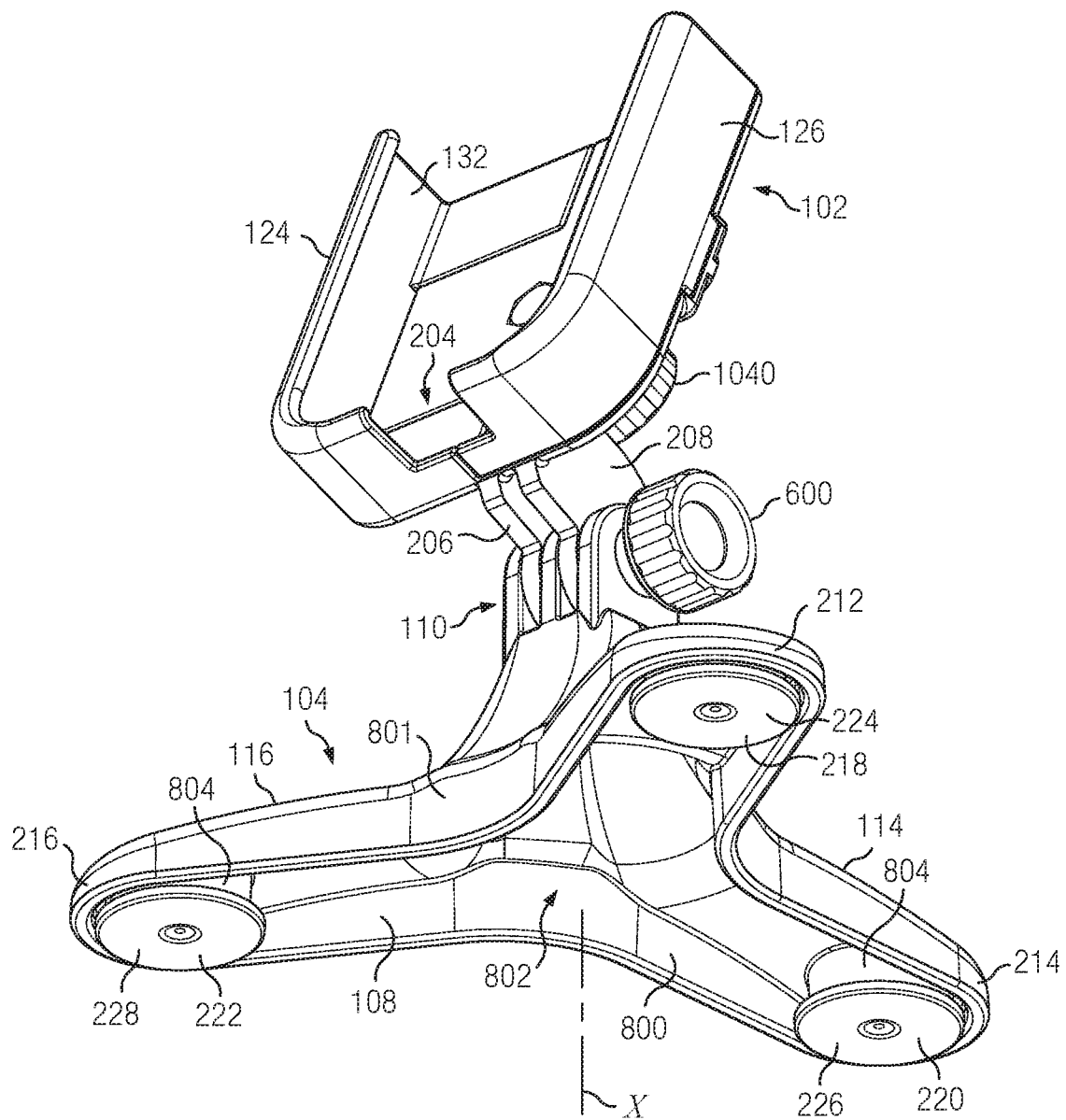
FIG. 8 is a bottom front perspective view of the embodiment as shown and configured in FIGS. 1-2 and 5-7.
Figure 9:
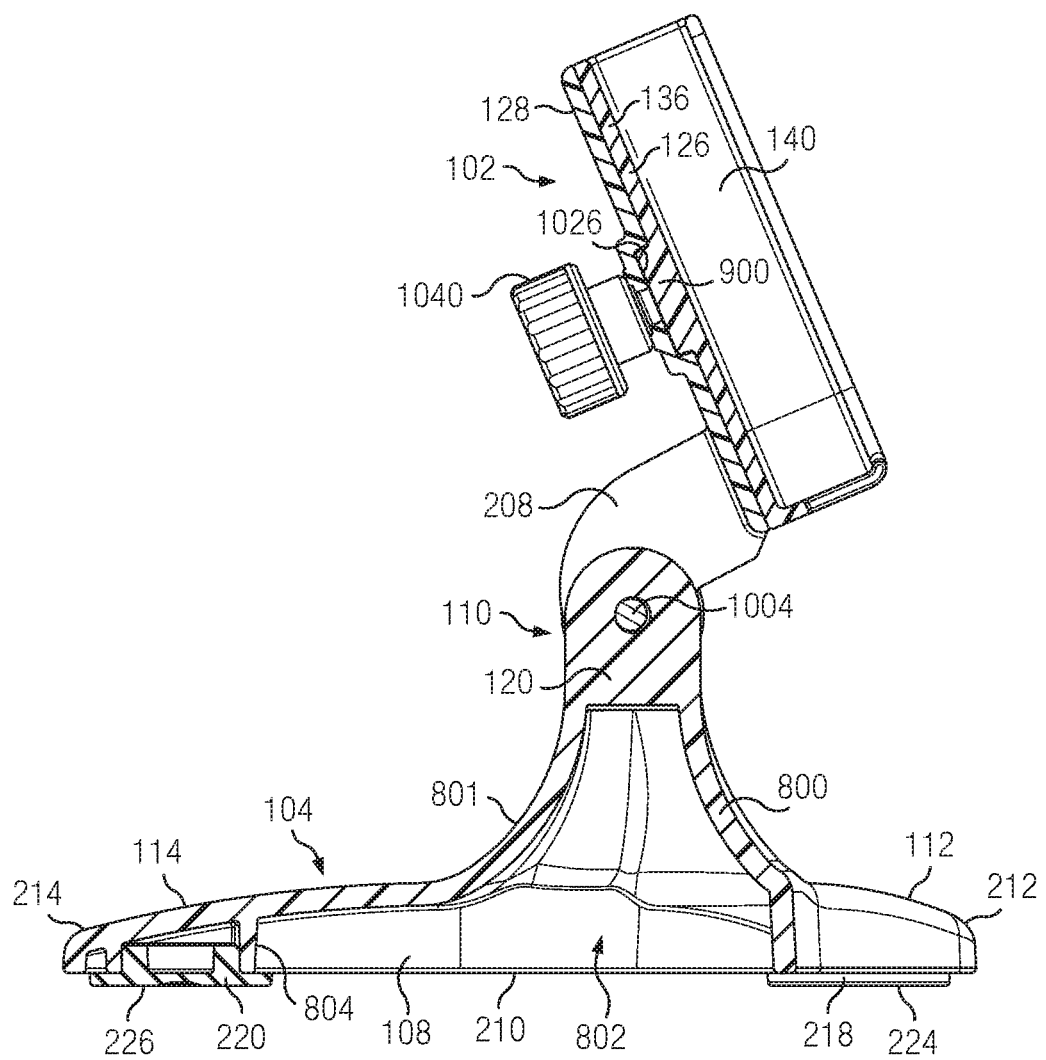
FIG. 9 is a vertical sectional view of the embodiment as shown and configured in FIGS. 1-2 and 5-8, taken from the left side of the stand and in a plane including a central mounting pier plate and rear stand leg.

Referring to FIG. 8, a body 801 of the stand base 104 conveniently may be injection-molded of plastic, and where injection molding is used as a fabrication technique, the base body 801 should have a sidewall 800 that at least roughly conforms to a nominal thickness throughout the part. This means that the body 801 will have a downward-facing cavity 802. Cavity 802 radially extends into each foot 212, 214, 216, where it is made to house respective gripping members 218, 220 and 222. The bodies of the gripping members 218-222 may each be adhered or otherwise fastened to the interiors of respective cylinders 804 that in turn downwardly depend from, and are molded extensions of, the base sidewall 800. In an alternative embodiment (not shown), the body 801 of the stand base 104 may be machined out of a solid block of aluminum or other metal, filling in cavity 802 except for the interiors of cylinders 804 or their equivalents.

Figure 10:
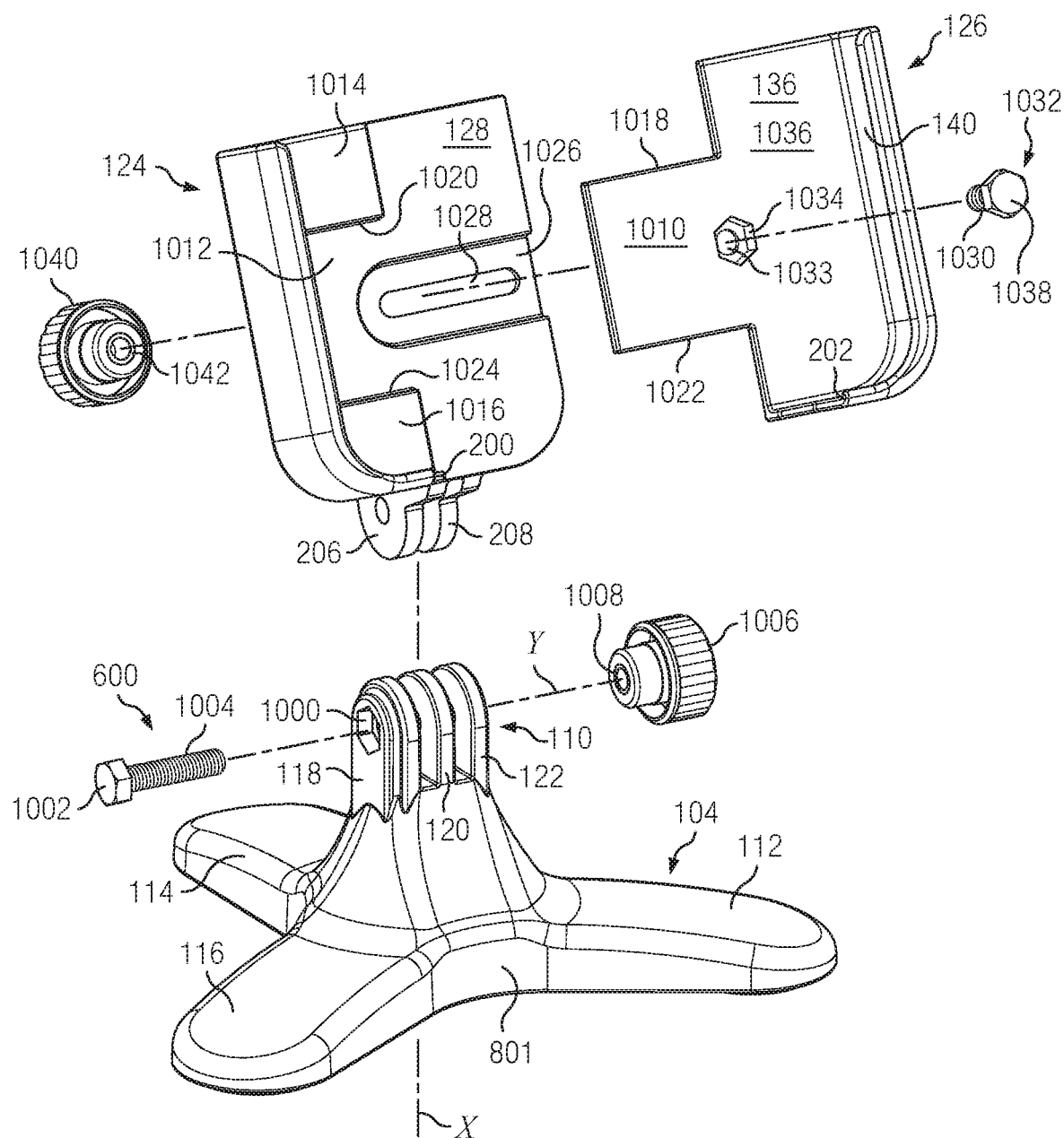
FIG. 10 is an exploded right front perspective view of the embodiment shown in FIG. 1.
Figure 11:
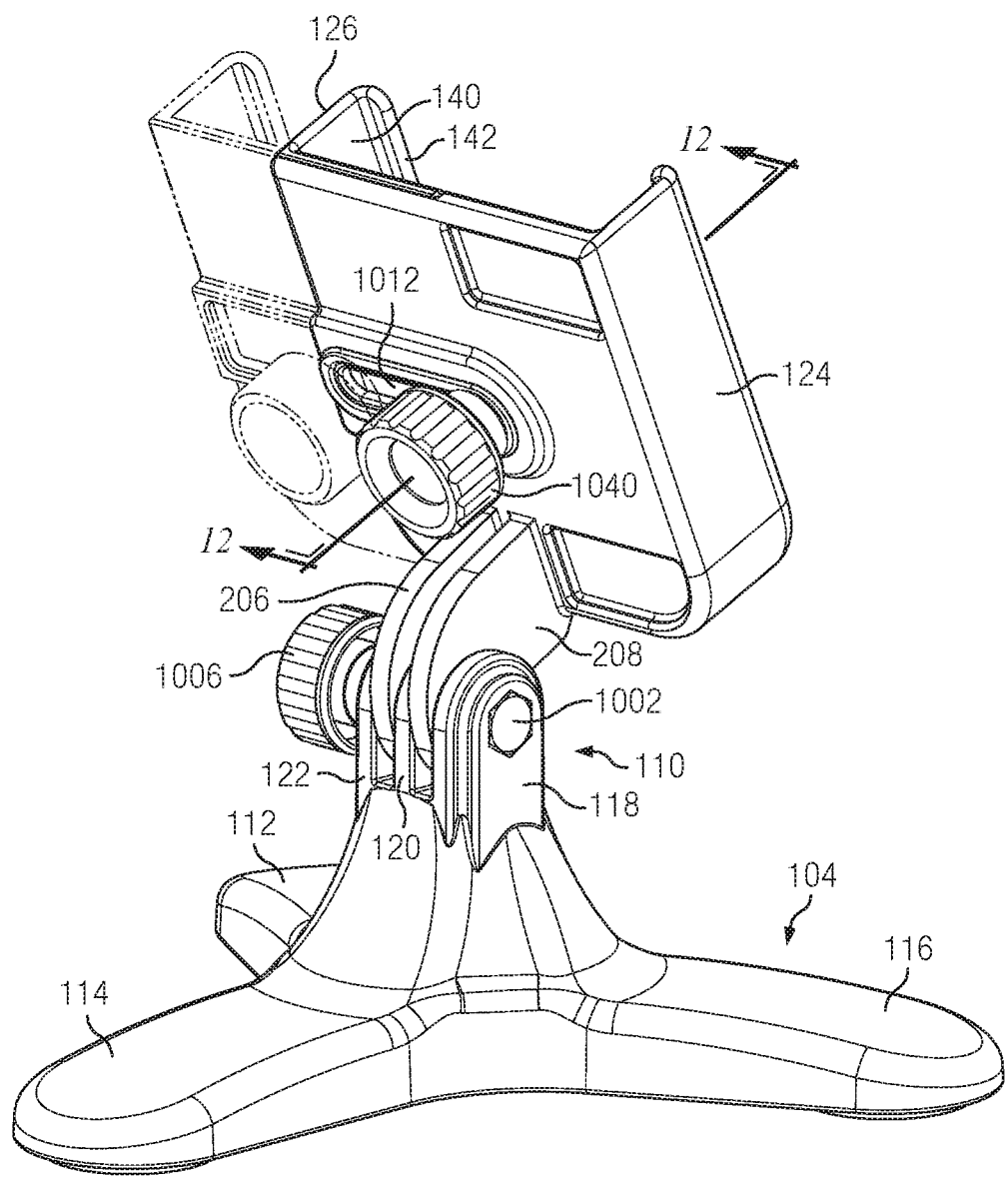
FIG. 11 is a right rear perspective view of the cell phone stand shown in FIG. 1, in which the movable jaw of the mounting bracket is shown in solid line at a smallest-width position, and in which the movable jaw at a greatest-width position is shown in phantom.
Figure 12:
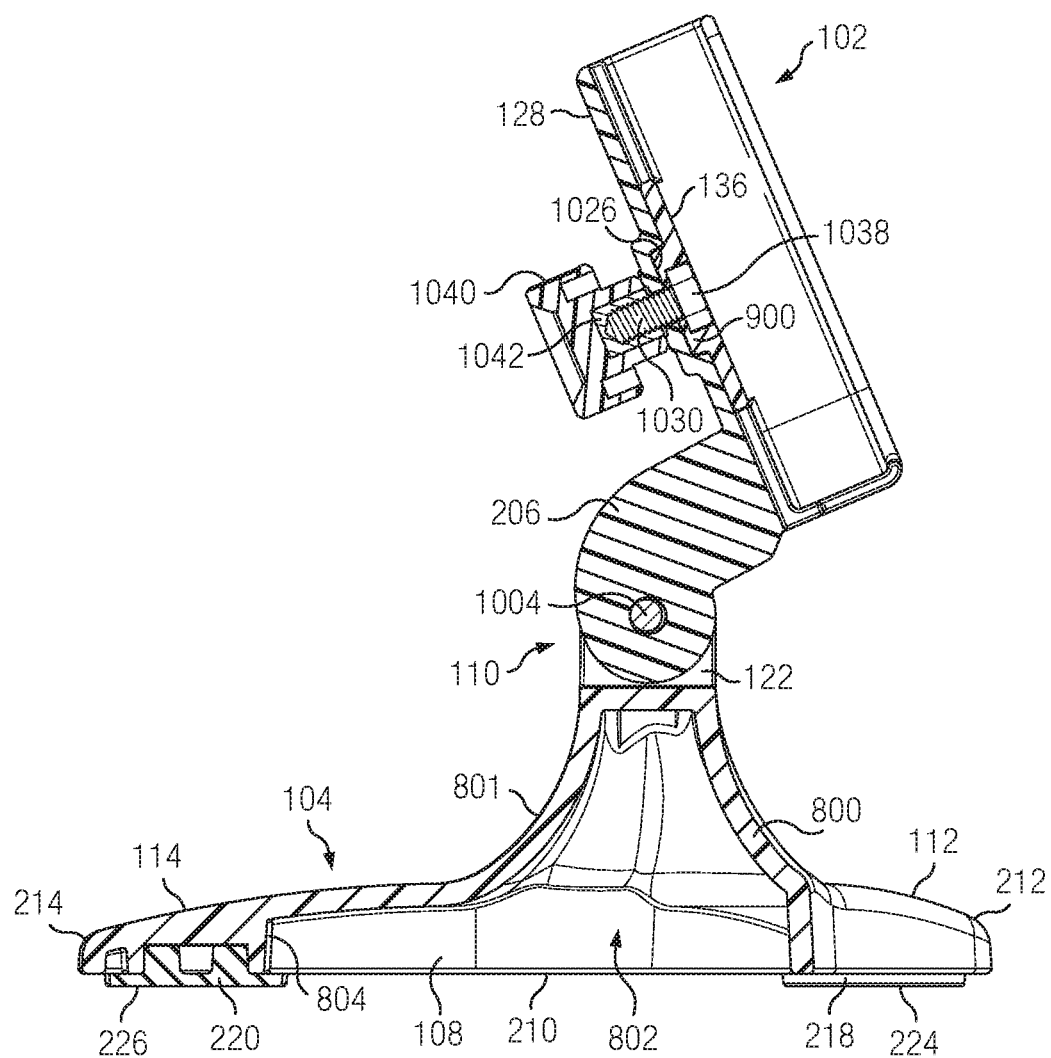
FIG. 12 is a cross-sectional view taken substantially along Line 12-12 of FIG. 11.

Further details of the illustrated embodiment are revealed by FIG. 10. The right pier plate 118 has been thickened so as to define a hexagonally shaped opening 1000 that closely receives a hex head 1002 of the pier clamping screw 600, thereby preventing a threaded clamping screw shaft 1004 from turning. Shaft 1004 is inserted through coaxial bores made in plates 118, 206, 120, 208 and 122, in that order. A fluted knob 1006, which may be fabricated with nylon and which may have a threaded metal insert 1008, is threaded onto threaded shaft 1004. Tightening knob 1006 will compress bracket support plates 206 and 208 between pier plates 118, 120 and 122, clamping in place the stationary jaw back plate 128 relative to axis Y and controlling one axis of adjustment of the cell phone screen relative to the user.

As best seen in FIG. 10, movable back plate 136 includes a relatively thin, rightward extending tongue 1010 that reciprocates within a shallow and wide horizontal slot 1012 defined by stationary back plate shoulder portions 1014 and 1016. An upper edge 1018 of tongue 1010 is parallel to axis Y and linear, and slides along lower edge 1020 of upper shoulder 1014. Lower edge 1020 of stationary back plate upper shoulder portion 1014 is linear and is aligned with axis Y. A lower edge 1022 of tongue 1010 is parallel to axis Y and linear, and slides along upper edge 1024 of stationary back plate lower shoulder portion 1016. Upper edge 1024 is also linear and is parallel to axis Y.

As seen in FIGS. 5, 9, 11 and 12, the movable jaw 126 has a thickened boss 900 with horizontal and parallel sides that slide within a depression 1026 (FIG. 10) in the stationary jaw 124. Centered within this depression 1026 is a slot 1028, elongate in the horizontal direction, which slidably receives a shaft 1030 of a cap screw 1032. Shaft 1030 is inserted into bore 1033 formed in back plate 136 and then through horizontal slot 1028. A hexagonally shaped cavity 1034 is formed in a forward surface 1036 of the movable jaw back plate portion 136. Cavity 1034 closely receives a hex head 1038 of the cap screw 1032. This prevents cap screw 1032 from turning. A jaw width adjusting knob 1040 may be formed of nylon with a threaded metal insert 1042 and is threaded onto the shaft 1030.

In use, the user slides the movable jaw 126 leftward or rightward relative to stationary jaw 124 to best fit a width of the user's cell phone, then tightens the knob 1040 on threaded shaft 1030 of screw 1032, thereby clamping movable jaw 126 to stationary jaw 124. Boss 900, depression 1026, cap screw 1030 and knob 1040 constitute a jaw clamp for clamping the movable jaw 126 to the stationary jaw 124, but this clamping action could be effected by other means or hardware.

Once the cell phone stand 100 has been adjusted for a particular cell phone and adjusted to optimize the direction in which the cell phone screen faces, it can be left in this condition. The user may at any time slip his or her cell phone into bracket 102, and then later easily remove the cell phone from stand 100 through the open top of bracket 102, with only one hand. The u-shaped cord opening 204, since it is open toward its front and top, permits the cell phone and cord to be extracted and installed as a unit without disconnecting the power/communications cord 400.

In summary, a new cell phone stand has been illustrated and described. A movable jaw allows easy adjustment to a particular cell phone width and a horizontal axis allows easy adjustment of the cell phone viewing angle. Both of these adjustments may be made with one hand. The open tops of the cell phone bracket and the cord channel permit easy insertion and extraction of the cell phone and power cord as a unit, also with a single hand.

While illustrated embodiments of the present invention have been described and illustrated in the appended drawings, the present invention is not limited thereto but only by the scope and spirit of the appended claims.

We claim:
1. A cell phone stand comprising:
   a base having a bottom end and a top end disposed above the bottom end, a mounting pier formed on the top end of the base to extend upwardly therefrom;

a cell phone mounting bracket rotatably affixed to the mounting pier around a horizontal axis and having first and second jaws;

the first jaw having a first back plate, a forward surface of the first back plate adapted for supporting a portion of the weight of a cell phone and being substantially planar, the first back plate having a side margin and a bottom margin, a first upper channel bottom integrally formed with the first back plate to forwardly extend from the side margin of the first back plate, a first lower channel bottom integrally formed with the first back plate to forwardly extend from the bottom margin of the first back plate, an upper portion of a first outer lip of the first jaw being integrally formed with the first upper channel bottom to inwardly extend from the first upper channel bottom so as to be parallel to the forward surface of the first back plate, the forward surface of the first back plate, the first tipper channel bottom, the first outer lip and the first lower channel bottom forming a first u-shaped channel;

the second jaw having a second back plate, a forward surface of the second back plate adapted for supporting a portion of the weight of the cell phone and being substantially planar, the second back plate having a side margin and a bottom margin, a second upper channel bottom integrally formed with the second back plate to forwardly extend from the side margin of the second back plate, a second lower channel bottom integrally formed with the second back plate to forwardly extend from the bottom margin of the second back plate, an upper portion of a second outer lip of the second jaw being integrally formed with the second upper channel bottom, the forward surface of the second back plate, the second upper channel bottom, the second outer lip and the second lower channel bottom forming a second u-shaped channel;

the forward surface of the first back plate being substantially coplanar with the forward surface of the second back plate, the first upper channel bottom facing the second upper channel bottom, the first lower channel bottom and the second lower channel bottom being aligned to each other so as to support a lower end of the cell phone; and the second back plate being horizontally slidable with respect to the first back plate, the cell phone mounting bracket further including means for affixing the second back plate with respect to the first back plate in any of a plurality of positions, so as to accommodate cell phones of different widths.

2. The stand of claim 1, wherein the first lower channel bottom has a first inner end and the second lower channel bottom has a second inner end facing the first inner end, the plurality of positions including a first position in which the first upper channel bottom is spaced from the second upper channel bottom by a first width and a second position in which the first upper channel bottom is spaced from the second upper channel bottom by a second width that is less than the first width, the second width being the smallest width at which the second back plate can be affixed to the first back plate, the first inner end and the second inner end, when the second back plate is affixed to the first back plate in the second position, defining an access hole therebetween for a cell phone electrical cable, the access hole being open in a forward direction so that the cell phone and the cell phone electrical cable may be installed into, and extracted from, the cell phone mounting bracket as a unit.

3. The stand of claim 1, wherein the plurality of positions are a plurality of first positions, a horizontal slot formed through the first back plate, the second jaw having a second back plate from which the second u-shaped channel extends, the second back plate having a clamp screw hole formed therethrough, a clamp screw extending through the clamp screw hole and the horizontal slot in the first back plate, the clamp screw operable to clamp the second back plate to the first back plate at any of a plurality of second positions, each second position corresponding to one of the first positions.

4. The stand of claim 1, wherein the mounting pier comprises at least one upstanding pier plate, at least one support plate formed to downwardly extend from the first back plate, a bore in the at least one support plate and a bore in the at least one pier plate disposed on the horizontal axis, the stand having an angular position clamp screw, a shaft of the angular position clamp screw threaded through the bore of the at least one support plate and the bore in the at least one pier plate, the angular position clamp screw operable to clamp the at least one support plate to the at least one pier plate in any of a plurality of angular positions.

5. The stand of claim 4, wherein the at least one pier plate is a first pier plate, a second pier plate of the mounting pier disposed to be spaced from and in parallel to the first pier plate, the at least one support plate disposed between the first pier plate and the second pier plate.

6. The stand of claim 5, wherein the at least one support plate is a first support plate, a second support plate downwardly extending from the first jaw in parallel to the first support plate, the second support plate disposed to be adjacent the second pier plate.

7. The stand of claim 6, wherein the mounting pier further includes a third pier plate spaced from the second pier plate and in opposition to the first pier plate, the third pier plate being in parallel to the first and second pier plates, the first support plate disposed between the first and second pier plates, the second support plate disposed between the second and third support plates.

8. The stand of claim 1, wherein the base is formed on a vertical axis, first, second and third legs of the base radially outwardly extending from the vertical axis and each terminating in a respective foot, each foot having a contact surface, the contact surfaces of the feet of the first, second and third legs occupying a single horizontal plane.

9. The stand of claim 8, wherein the each of the first, second and third legs is formed of a first material with a first coefficient of friction, each foot having a gripping member forming a respective contact surface, the gripping members being formed of a second material, a coefficient of friction of the second material being higher than the coefficient of friction of the first material.

10. The stand of claim 9, wherein the first, second and third legs each have a bottom margin composed of the first material, the contact surfaces being disposed in a plane below the bottom margins of the first, second and third legs.

11. The stand of claim 9, wherein the second material is a thermoplastic elastomer.

12. The stand of claim 9, wherein the first material is ABS plastic.

13. The stand of claim 1, wherein the first outer lip further includes a first lower lip portion upwardly extending from the first lower channel bottom in parallel to the forward surface of the first back plate, the second outer lip including a second lower lip portion extending from the second lower channel bottom in parallel to the forward surface of the second back plate.

* * * * *